(12) United States Patent
Seshadri

(10) Patent No.: US 8,849,809 B1
(45) Date of Patent: Sep. 30, 2014

(54) AUTOMATED IDENTIFICATION OF NEWS EVENTS

(75) Inventor: Nandini Seshadri, Mountain View, CA (US)

(73) Assignee: Google Inc., Mountain View, CA (US)

(*) Notice: Subject to any disclaimer, the term of this patent is extended or adjusted under 35 U.S.C. 154(b) by 383 days.

(21) Appl. No.: 12/722,048

(22) Filed: Mar. 11, 2010

(51) Int. Cl.
*G06F 7/00* (2006.01)
*G06F 17/00* (2006.01)

(52) U.S. Cl.
USPC .......................................... 707/725

(58) Field of Classification Search
USPC ................. 707/725, 723, 722, 706
See application file for complete search history.

(56) References Cited

U.S. PATENT DOCUMENTS

| 7,739,254 B1 | 6/2010 | Osinga | |
|---|---|---|---|
| 2009/0048927 A1* | 2/2009 | Gross | 705/14 |

OTHER PUBLICATIONS

Nandini Seshadri, "The story, as it unfolded", Google News Blog [online], Apr. 14, 2009, retrieved from <http://googlenewsblog.blogspot.com/2009/04/story-as-it-unfolded.html>, 3 pages.

* cited by examiner

*Primary Examiner* — Usmaan Saeed
*Assistant Examiner* — Paul Kim
(74) *Attorney, Agent, or Firm* — Fish & Richardson P.C.

(57) ABSTRACT

Methods, systems, and apparatus, including computer programs encoded on computer storage media, for automatic identification of news events. One method includes obtaining scores for a plurality of time entries, each time entry corresponding to a time period during which one or more articles on a topic were published, where the time entries have an associated order with respect to a timeline. The method further comprises identifying candidate regions of time entries, where each candidate region includes one or more time entries that follow each other in the order, and selecting a desired number of regions from the candidate regions. The method further includes selecting an article for each selected region and presenting a summary of the topic. The summary references the selected articles.

21 Claims, 8 Drawing Sheets

AUTOMATED IDENTIFICATION OF NEWS EVENTS

BACKGROUND

This specification relates to identifying and presenting news events.

As the Internet has increased in popularity, the number of news articles available on the Internet has also increased. The large number of articles on a given topic, e.g., news stories about a particular news event, can make it difficult for a user to quickly gain an understanding of a history of the topic. Users must generally read through many articles, which often provide redundant information, before forming an understanding of a topic.

One way to help users sift through the large amount of information available to them is to cluster articles on a topic according to keyword-based clustering. Articles with similar terms are clustered together. However, articles on the same topic generally share many of the same keywords, and later articles on a new aspect of a topic will often recap events that happened earlier in the history of the topic. Thus, keyword based clustering is not always an accurate, or useful, way to group articles that are related to the same general topic.

SUMMARY

In general, one aspect of the subject matter described in this specification can be embodied in methods that include the actions of obtaining scores for a plurality of time entries, each time entry corresponding to a time period during which one or more articles on a topic were published, where the score for a time entry represents the one or more articles published during the time period of the time entry, and where the time entries have an associated order with respect to a timeline; identifying candidate regions of time entries, where each candidate region includes one or more time entries that follow each other in the order, and where the candidate regions are separated from each other by one or more time entries each having a score less than a threshold; selecting a desired number of regions from the candidate regions; selecting an article for each selected region, wherein the article selected for a region is an article associated with a particular time entry of the one or more time entries in the selected region; and presenting a summary of the topic, wherein the summary references the selected articles. Other embodiments of this aspect include corresponding systems, apparatus, and computer programs recorded on computer storage devices, each configured to perform the operations of the methods.

These and other embodiments can each optionally include one or more of the following features.

The actions can further include determining the desired number of regions according to the scores and the amount of time represented by the time entries. The score for a time entry can be the number of articles associated with the time entry. The score for the time entry can be a sum of article scores for the one or more articles associated with the time entry. An article score for an article can be derived from a content quality score and a source quality score for the article. The article score can be further derived by applying a low-pass filter that modifies the article score for an article according to article scores for articles that were published after the article.

The threshold can be a percentage of a highest score for the time entries in the data. Selecting a desired number of regions from the candidate regions can include deriving a scoring factor by dividing the number of desired regions by a sum of the scores for each time entry; determining a quota for each region, the determining including multiplying the scoring factor by the sum of the scores for time entries in the region; and selecting regions according to the quota for each candidate region. Determining a quota for each region can further include determining a spill for each region; ranking the candidate regions according to the quota and spill for each region; dividing a sum of the spills for each candidate region among the candidate regions according to the ranks of the candidate regions; and adding the divided spill allocated to one or more regions to the quota for the region. Selecting regions according to the quota can further include sub-dividing each candidate region into a number of regions corresponding to the quota for the candidate region.

Selecting an article for a selected region can include selecting an article having a highest article score of the articles corresponding to time entries in the region. Selecting an article for a selected region can include clustering the articles corresponding to time entries in the region to generate a cluster of articles and one or more outlying articles that are not in the cluster; and selecting an article from the cluster of articles, the selected article having a highest article score of the articles in the cluster. Presenting the summary of the topic can include presenting a timeline of articles on the topic, the timeline including an identification of each of the selected articles. The actions can further include estimating a time for an event corresponding to each selected region from an article associated with the selected region.

Particular embodiments of the subject matter described in this specification can be implemented so as to realize one or more of the following advantages. Relevant events can be identified from large groups of articles. The time of relevant events can be estimated.

Articles can be grouped together according to the events to which the articles correspond. Users can be presented with a convenient summary of events related to a topic as the events occurred over time. More accurate identification of key events can be performed.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
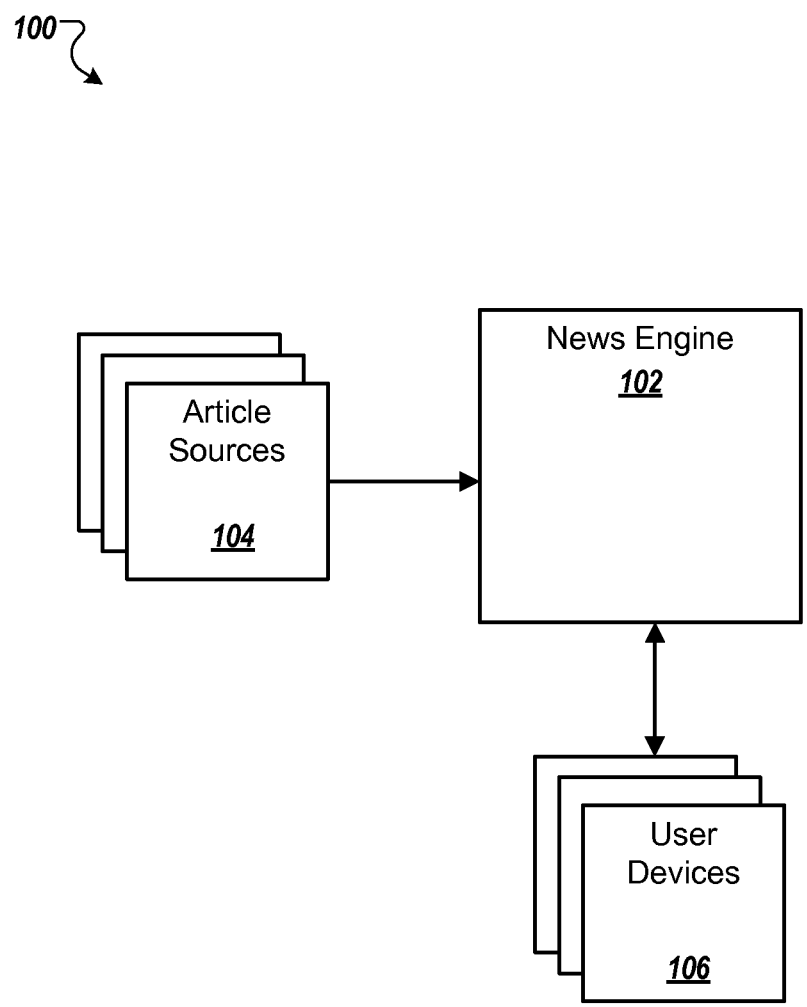
FIG. 1 illustrates an example system including an example news engine that processes articles from article sources and presents news events to user devices.

FIG. 1 illustrates an example system 100 including an example news engine 102 that processes articles from article sources 104 and presents news events to user devices 106. The news engine 102 can be implemented on one or more computers. Each user device 106 can be an electronic device. Example user devices include laptop computers, personal computers, and mobile devices.

Each article source 104 is a source of one or more articles, e.g., news articles, blog posts, and status updates, e.g., microblog posts. The article sources 104 can include various websites, blogs, and feeds, e.g., Really Simple Syndication (RSS) feeds. The news engine 102 receives one or more articles from each of the article sources 104. When an article source provides published web documents, for example, when the article source is a news website or a blog, the news engine 102 can receive data describing articles from a search system that crawls and indexes web resources. The search system can be part of the news engine 102 or can be a separate system. When an article source is a news feed, the news engine 102 can receive data describing articles directly from the news feed.

The news engine 102 groups the received news articles according to their topics. In some implementations, the topics of news articles are determined from the terms occurring in the news articles. For example, the news engine 102 can use conventional keyword clustering techniques to group articles that share a same topic. In some implementations, the topics of news articles can be determined from alternative or additional signals. For example, some article sources 104 may include data specifying the topics of the articles provided by the article source 104. The specified topic can then be used as the topic of the article. In some implementations, for example, when the articles are microblog posts, posts that are part of the same thread can be considered to be part of the same topic.

In some implementations, the news engine 102 filters the news articles for each topic, for example, to remove duplicate articles or articles whose headline or relevant text are not relevant to the topic. Conventional duplicate detection and other filtering techniques can be used.

The news engine 102 then identifies articles summarizing the topic of each group of articles. In general, the articles summarizing the topic of each group of articles include articles describing news events in the history of the topic. A news event is an important event in the history of a topic. For example, if the topic is a space shuttle flight, where the space shuttle launched, was damaged during launch, fixed at the International Space Station, and then returned safely to earth, the news events could be identified as follows: the space shuttle launched, the space shuttle docked with the International Space Station, damage to the space shuttle was identified, work began on fixing the damage, the damage was successfully fixed, and the space shuttle safely returned to earth. In some implementations, the news engine 102 identifies the news events based only on the time at which articles were published, and not on the text of the articles. Generally when a news event occurs, a large number of articles will be published describing the event. Techniques for identifying news events are described in more detail below.

Once the news events are identified, the news engine 102 sends a summary of the events to one or more user devices 106. The summary can be, for example, a collection of articles where each article describes one of the events. The events can be identified in the summary, for example, relative to a graphical display of news articles that labels a specified number of important events.

Figure 2:
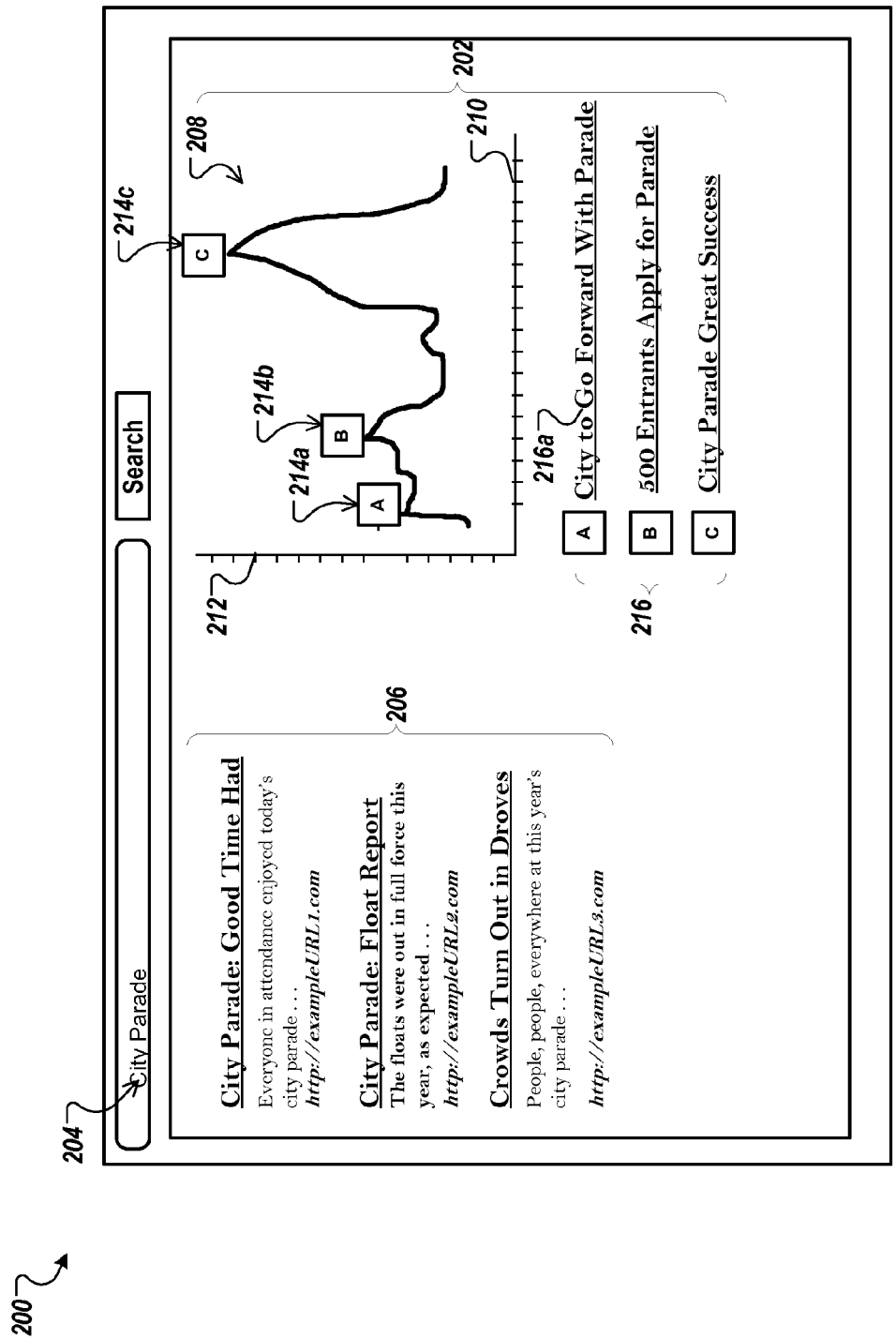
FIG. 2 illustrates an example search user interface presenting a summary of events in the history of a topic.

FIG. 2 illustrates an example search user interface 200 presenting a summary 202 of events in the history of a topic. The user interface 200 can be displayed by a user device 106.

Query 204 is entered into a search box in user interface 200, for example, by a user. In response to query 204, user device 106 requests search results from a search engine. The search engine generates responsive search results 206 and sends them to user device 106 for presentation to the user.

User interface 200 also includes the summary 202 of news events in the history of a topic corresponding to the user search query. The summary is presented as a timeline 208 that shows how many articles were published over time. The x-axis 210 of the timeline corresponds to time. The y-axis 212 of the timeline corresponds to a number of articles published. Thus, the timeline 208 provides a visual summary of how many articles on a particular topic are published over time.

The timeline 208 also includes labels 214 identifying important events. In general, each important event corresponds to a peak in the number of published articles. Links 216 (e.g., hyperlinks) to an article representing each event are provided next to the timeline. Each link is labeled with a label that matches the label on the timeline. For example, label 214a is presented on the timeline 208 and a copy of label 214a is presented next to link 216a. This allows users to easily match the labels on the graph with the articles corresponding to the labels.

Figure 3:
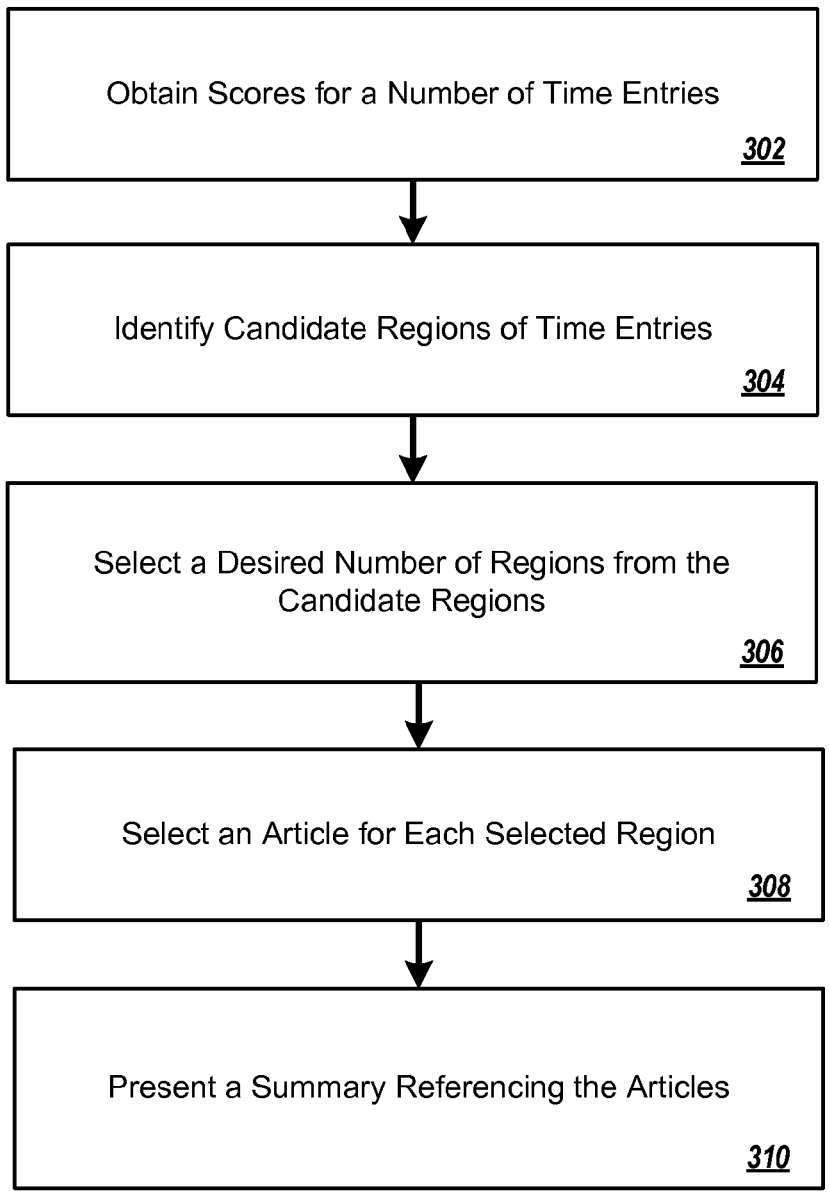
FIG. 3 is a flow chart of an example method for identifying and presenting articles summarizing a particular topic.

FIG. 3 is a flow chart of an example method 300 for identifying and presenting articles summarizing a particular topic. For convenience, the method 300 is described with reference to a system that performs the method. The system can be, for example, the news engine 102.

The system obtains (302) scores for a number of time entries. Each time entry corresponds to a time period during which one or more articles on the particular topic was published. The time entries have an associated order with reference to a timeline.

The time entries can correspond to short periods of time, for example, a millisecond, five milliseconds, or a second. The time entries can also correspond to longer periods of time. The time entries can each correspond to the same amount of time, or can correspond to different amounts of time. In some implementations, the time entries are selected to each correspond to a pre-determined amount of time. In some implementations, the time entries are selected so that each time entry corresponds to a time period during which a single article was published.

The score for each time entry represents the one or more articles published during the time period of the time entry. The scores can be calculated according to various heuristics. For example, in some implementations, the score for a time entry corresponds to the number of articles published during the time period of the time entry. For example, if one article was published during the time period of the time entry, the score would be 1; if two articles were published during the time period of the time entry, the score would be 2. In some other implementations, the score for a time entry corresponds to a sum of article scores for the one or more articles published during the time period of the time entry.

The article score for a given article can be derived from one or more signals. Example signals include a content quality score and a source quality score for the article. A content quality score is a score estimating the overall quality of the content of the article.

The quality of the content of the article can be derived from one or more signals. These can include conventional signals for quality, including, for example, signals computed from links between articles and signals that indicate whether a document is potentially spam. The signals can also include signals indicating the length of the article, whether the article uses good grammar, or how well the article satisfies other specified rules that indicate article quality.

A source quality score is a score estimating the overall quality of the source from which the article was received. The source quality score can be derived from one or more signals. Example signals include third party ratings of the source, rankings of the importance of the source, the number of articles published by the source, an average length of the articles published by the source, the number of original named entities in articles published by the source, an amount of network traffic to the source, the number of countries from which the network traffic to the news source's web site originates, circulation statistics for the source, and a size of the staff of the news source. In some implementations, the source quality score is specific to a categorization of the topic of the article. For example, some sources may be identified as providing better-quality articles about sports, while other sources may be identified as providing better quality articles about politics.

In some implementations, the article score is further weighted by applying a low-pass filter that modifies the article score for an article according to the article scores for articles that were published after the article. For example, the filter can be applied from the oldest time entry to the newest time entry, where for a given time entry i, the adjusted score is:

adjusted score[$i$]=score[$i$]+α×adjusted score[$i-1$],

Where $i-1$ is the time entry that comes immediately before time entry i according to the timeline. α can be determined empirically. An example value for α is 0.99.

The system identifies (304) candidate regions of time entries. Each candidate region includes one or more consecutive time entries that follow each other in the order for the time entries. The candidate regions are separated by each other in the order by one or more time entries having a score that is less than a threshold. In some implementations, the threshold is a fixed value. In some other implementations, the threshold is a percentage of a particular score selected from the scores for the time entries. The particular score can be, for example, the highest score, median score, or mean score of the time entries in the data.

The system selects a desired number of regions from the candidate regions (306). The desired number of regions is the same as the desired number of events summarizing the topic. In some implementations, the system determines the desired number of regions according to the scores for the time entries and the amount of time represented by the times of the time entries. For example, the desired number of regions can be calculated according to the following formula:

$$\text{desired number of regions} = 2 \times \log\left(\frac{\sum \text{time entry scores}}{\text{number of days} + 1}\right),$$

where the number of days is the number of days corresponding to the time of the time entries. Other measures of time, besides the number of days, can also be used.

The selected regions can correspond to the candidate regions themselves, or to sub-divisions of the candidate regions. An example method for selecting the desired number of regions is described below with reference to FIG. 4.

The system selects (308) an article for each selected region. The article selected for a given region is an article associated with one of the one or more time entries in the given region. Various techniques can be used to select the article for an identified region. In some implementations, the selected article is the article having the highest article score of the articles published during the time of the time entries in the region. In other implementations, the selected article is selected at random from the articles published during the time of the time entries in the region.

In still other implementations, the system selects an article for a selected region by clustering the articles corresponding to time entries in the region to generate a cluster of articles and one or more outlying articles that are not in the cluster, and then selecting an article from the cluster of articles. The selected article can, for example, be the article having the highest score of articles in the cluster, or can be selected according to other criteria, for example, at random.

The system presents (310) a summary referencing the selected articles. In some implementations, the summary is a timeline of articles on the topic and an identification of each of the selected articles. An example presentation is described above with reference to FIG. 2.

In some implementations, the system estimates a time that an event corresponding to each region took place from the articles in the regions. For example, the system can select the earliest article in a time region and use the time that article was published, or the time that article was published minus a threshold time period, as the time that the event took place. The system can also calculate a mean, median, mode, or other measure from the times that the articles in the selected region were published, and use that measure as the time the article was published.

In some implementations, the system stores data associating each article with its corresponding region. The system can then use this data to identify related articles to suggest to users viewing an article in one of the selected regions. For example, the system can identify articles in the same region as being related articles, or can identify articles in an immediately proceeding or immediately succeeding region as related articles.

Figure 4:
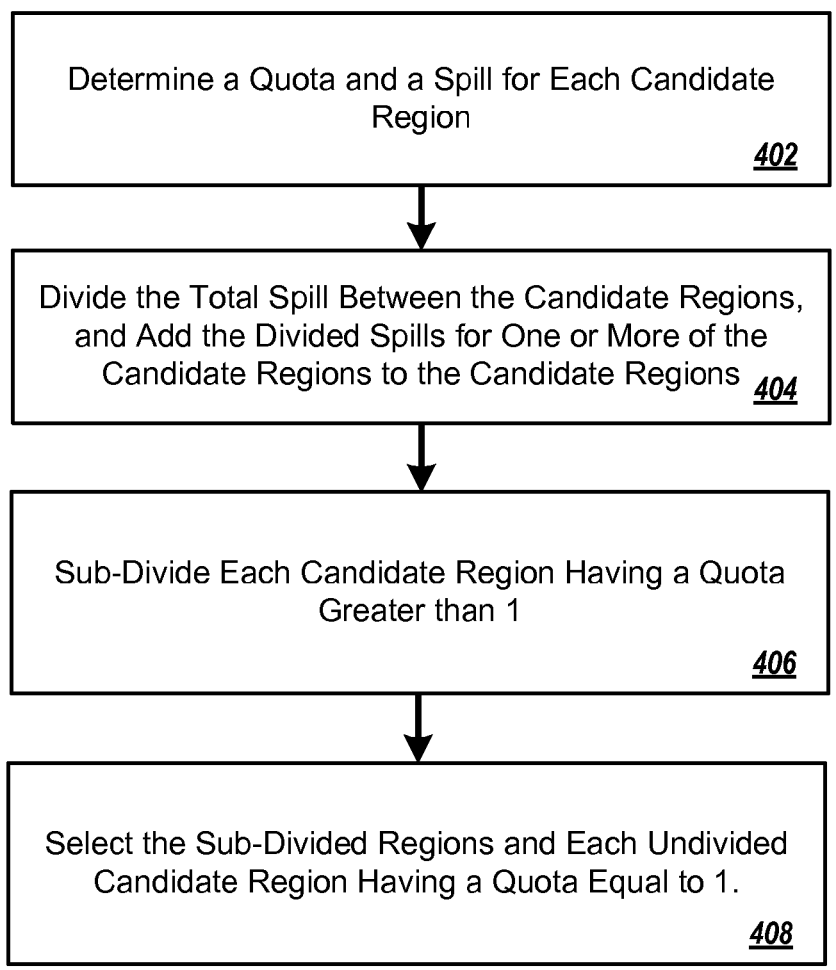
FIG. 4 is a flow chart of an example method for selecting regions from candidate regions.

FIG. 4 is a flow chart of an example method 400 for selecting regions from candidate regions. For convenience, the method 400 is described with reference to a system that performs the method. The system can be, for example, the news engine 102.

The system determines (402) a quota and a spill for each of a number of candidate regions. Together, the quota and spill are an indication of how the overall scores in the candidate region compare to the overall scores in the other regions. The system derives the quota and spill as follows.

First, the system derives a scoring factor by dividing the number of desired regions by a sum of the scores for each time entry. Then, for each candidate region, the system determines the quota and spill by multiplying the scoring factor by the sum of the scores for time entries in the region. The integer part of the result is the quota, and the decimal part of the result is the spill. For example, if the desired number of regions is 5, and the sum of scores for each time entry is 100, then the scoring factor would be 5/100=0.05. If the sum of the scores of the time entries in a candidate region is 23, then the result of the multiplication would be 23×0.5=1.15. Therefore, the quota is 1, and the spill is 0.15.

The system divides (404) the total spill between the candidate regions, and then adds the divided spill for each candidate region to the quota for the candidate region. The total spill is the sum of the spills for all candidate regions. The total spill is divided in integer amounts, e.g., each candidate region that is allocated part of the spill will have an integer amount of the spill (e.g., 1, 2, 3, etc.) added to its quota.

The system can divide the total spill among the candidate regions according to various heuristics. In some implementations, the total spill is divided according to the individual quota and spill for each candidate region. In general, the lower the quota of a region, the higher the chance that the region will get part of the total spill. Similarly, the lower the spill of a region, the lower the chance that the region will get part of the total spill.

In some implementations, the system ranks the candidate regions according to a heuristic calculated from the spill and quota of each region. Then, the system moves an integer amount of the spill to each candidate region according to the order, until all of the total spill has been allocated.

An example sorting order would rank candidate region p above candidate region q if:

$$((p.\text{quota}+C) \times q.\text{spill}) < ((q.\text{quota}+C) * p.\text{spill}),$$

where C is a constant, for example, 0.3. For example, if candidate region A had a quota of 1 and a spill of 0.2, candidate region B had a quota of 0 and a spill of 0.7, and candidate region C had a quota of 0 and a spill of 0.1, the system would rank the candidate regions in the order: candidate region B, candidate region C, candidate region A. Because the total spill is 0.2+0.7+0.1=1, 1 would be added to the quota for candidate region B, and nothing would be added to the quotas for candidate regions C and A.

The system sub-divides (406) each candidate region having a quota greater than 1. For example, the system can sub-divide each candidate region by gradually increasing a threshold value (e.g., by increments of 10%) until the desired number of sub-regions are separated by each other in the order by one or more time entries having a score that is less than the threshold.

If the gradual increase in the threshold value results in more sub-regions than the desired number of sub-regions, the system can rank the sub-regions, for example, according to the heuristic described above, and select highest ranked sub-regions. The remaining sub-regions can be divided between the selected sub-regions.

In some implementations, before the system sub-divides a candidate region, the system compares the sum of the scores for each time entry to a threshold value. If the sum of the scores fails to satisfy, e.g., is below, the threshold value, the system does not sub-divide the candidate region and instead reassigns the additional quota to a different region.

The system selects (408) the sub-divided regions and each un-divided candidate region having a quota equal to 1.

FIGS. 5A-5D illustrate a graphical representation of time entry data for articles on a particular topic used to identify important events that summarize the topic.

Figure 5A:
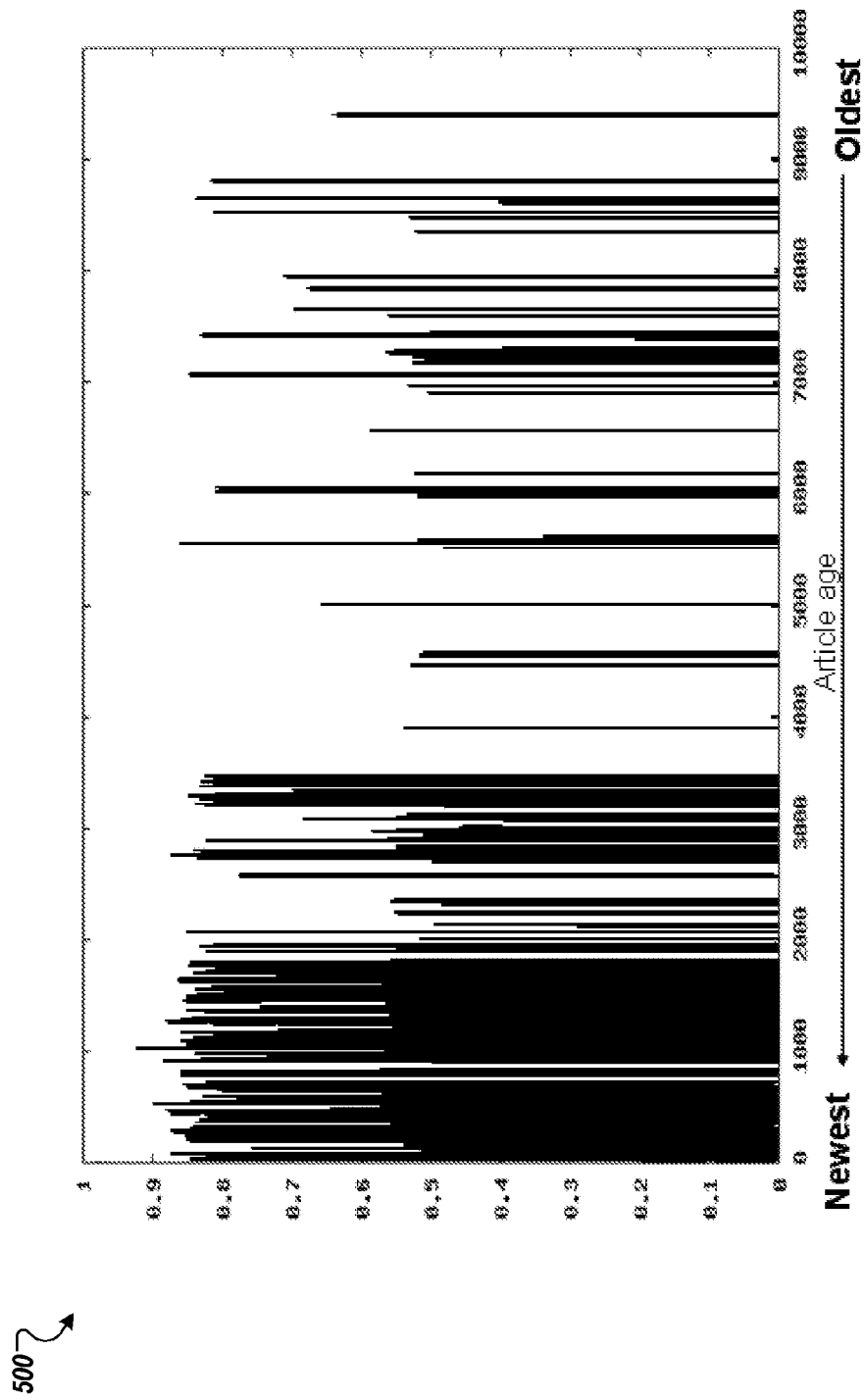
FIGS. 5A-5D illustrate a graphical representation of time entry data for articles on a particular topic used to identify important events that summarize the topic.

FIG. 5A is a graph 500 illustrating example time period scores over time. Each vertical bar in FIG. 5A corresponds to a single article published during a particular time period.

The height of each bar represents the article score for the article corresponding to the bar. For illustrative purposes, each time period illustrated in FIG. 5A corresponds to a time when a single article was published. Therefore, the time period score is equal to the article score of the article published during the time period. However, as discussed above, in other implementations, multiple articles can be published during a time period, in which case a time period score, rather than an individual article score, is used for each time period.

Figure 5B:
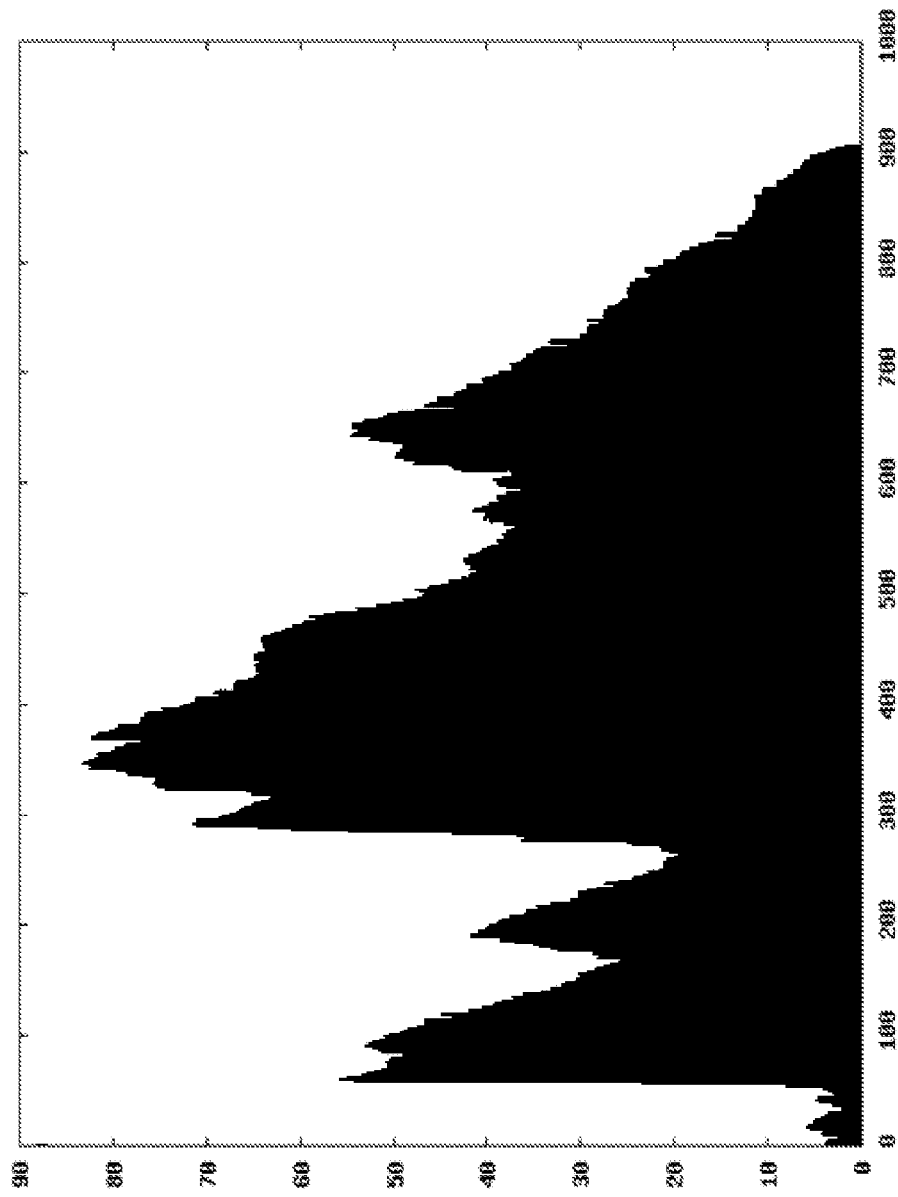

FIG. 5B is a graph 510 of the data illustrated in FIG. 5A after a low-pass filter has been applied to the article scores. The x-axis of FIG. 5B is modified from the time-based x-axis of FIG. 5A to an x-axis that identifies the order in which the articles were published without tracking the relative time between when the articles were published.

Figure 5C:
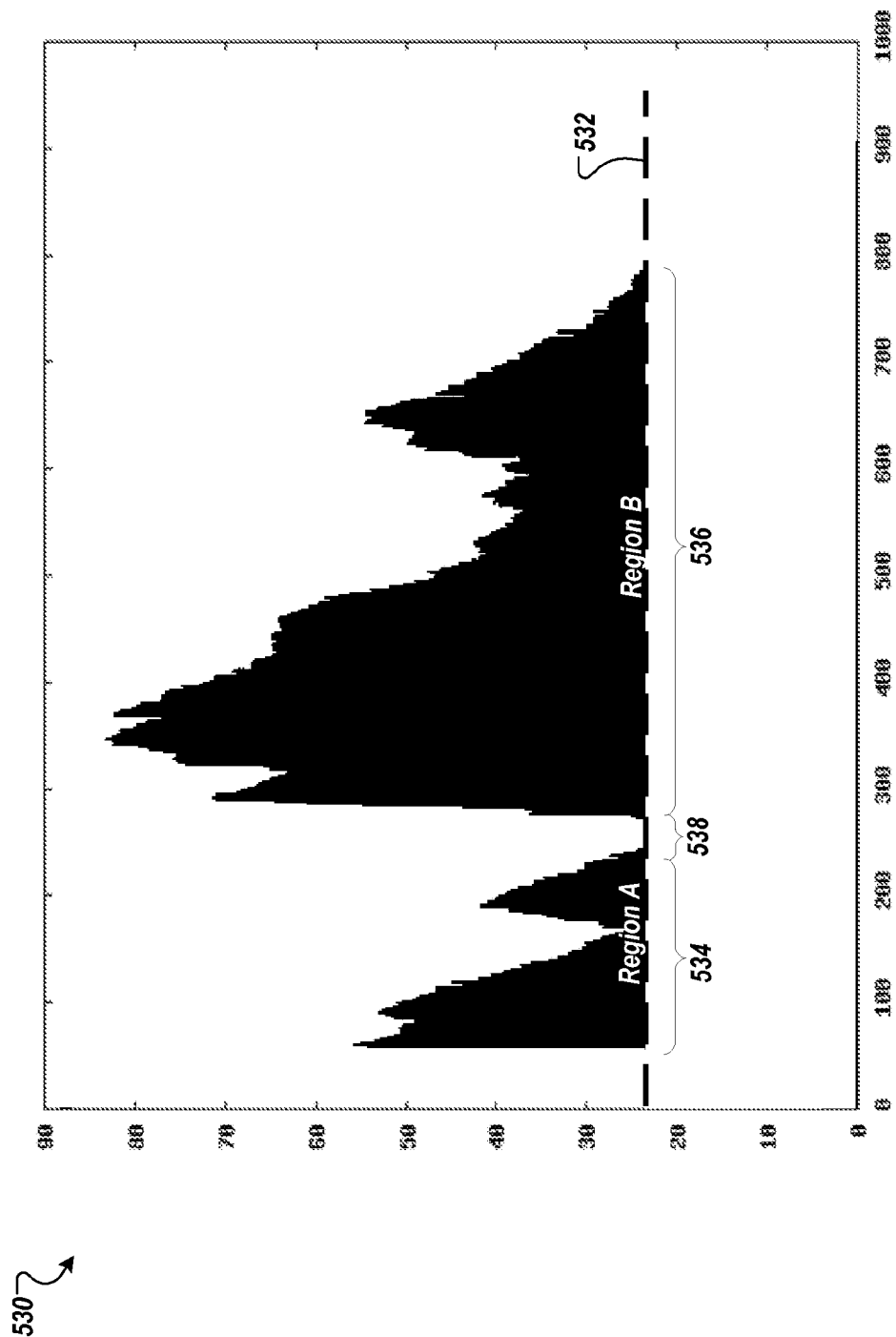

FIG. 5C is a graph 530 illustrating candidate regions identified from the data in the graph of FIG. 5B. A threshold 532 is identified, for example, as described above with reference to FIG. 3. All data for time entries having a score less than the threshold is removed from the graph. This leaves two candidate regions 534 and 536, separated by a gap 538. The gap 538 corresponds to one or more time entries that have a score less than the threshold.

Figure 5D:
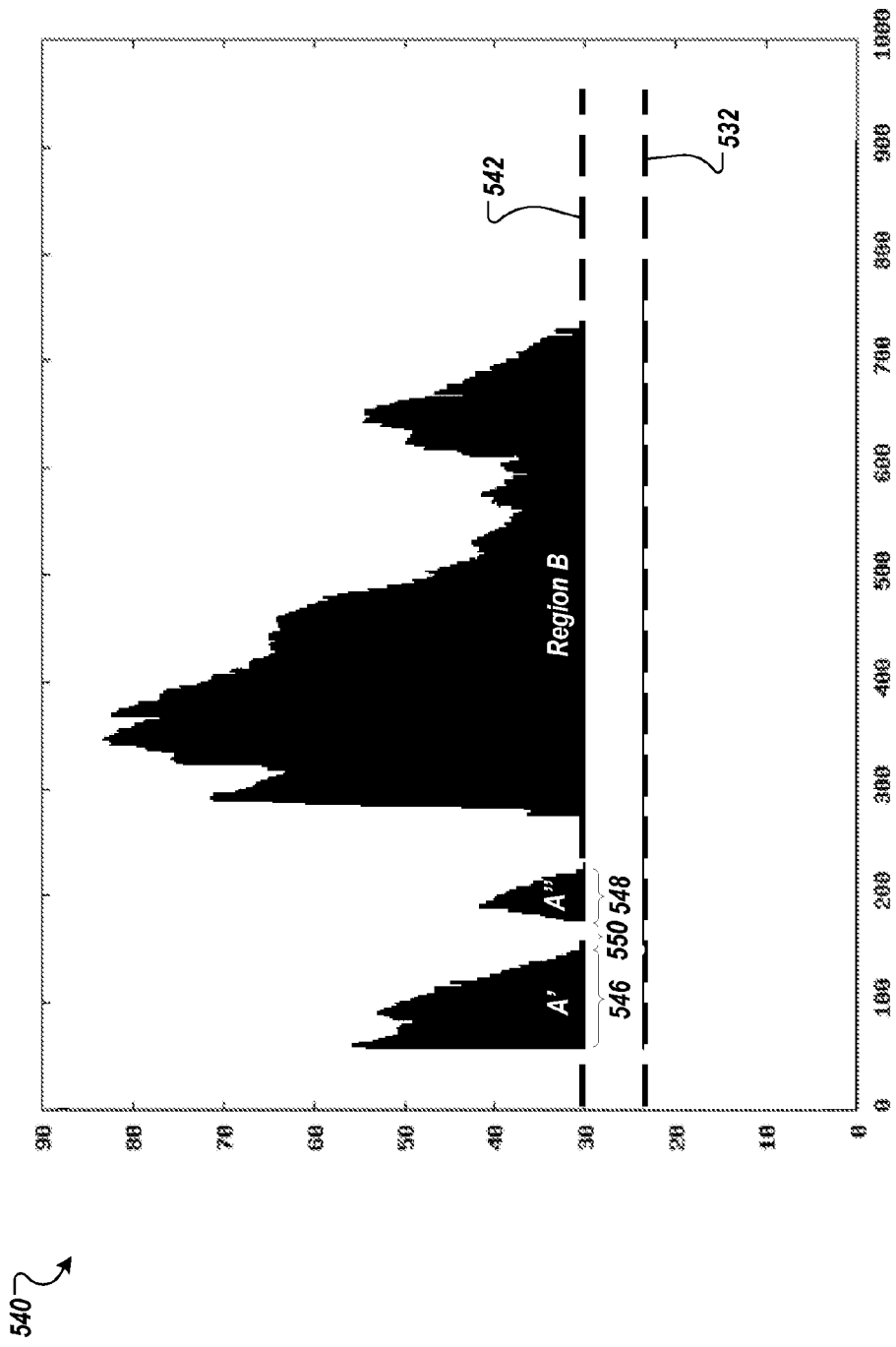

FIG. 5D is a graph 540 illustrating sub-dividing candidate region A 534 illustrated in FIG. 5C. In the example illustrated in FIG. 5D, the quota for candidate region A is 2, and therefore, candidate region A needs to be divided into two regions.

A second threshold 542 is identified, and all data for candidate region A 534 that has a value less than the threshold 542 is removed from the graph. This leaves two separate regions, candidate region A' 546 and candidate region A" 548. These two regions are separated by a gap 550 corresponding to one or more time entries whose score is less than the threshold. The two regions A' 546 and A" 548 are selected, and an article corresponding to each region is chosen.

Candidate region B 536 can be similarly subdivided using a different threshold. For example, the different threshold can be identified and all data for candidate region B 536 that has a value less than the different threshold can be removed from the graph. The separate regions resulting from the removal of the data can then be selected.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    calculating a respective article score for each of a plurality of articles on a topic wherein the respective article score is calculated, in part, from a respective score of another article in the plurality of articles that was published before the article;
    obtaining respective scores for a plurality of time entries, each time entry corresponding to a time period during which one or more articles on a topic were published, wherein the score for a time entry is based on, at least, a combination of respective article scores for each of the one or more articles associated with the time entry, and wherein the time entries have an associated order with respect to a timeline;

identifying candidate regions of time entries, wherein each candidate region represents one or more time entries that follow each other in the order, and wherein the candidate regions are separated from each other in the order by one or more time entries each having a score that does not exceed a threshold;

selecting a plurality of regions from the candidate regions;

selecting a respective article for each selected region, wherein the article selected for the region is an article associated with a particular time entry of the one or more time entries of the region; and providing a summary of the topic, wherein the summary references the selected articles.

2. The method of claim 1, further comprising selecting the plurality of regions based on, at least, the score and an amount of time represented by each of the plurality of time entries.

3. The method of claim 1 wherein an article score for an article is based on, at least, a content quality score and a source quality score for the article.

4. The method of claim 1 wherein the threshold is based on a highest score of the plurality of the time entry scores.

5. The method of claim 1 wherein selecting the plurality of regions from the candidate regions comprises:

calculating a scoring factor by dividing a number of desired regions by a sum of the scores for the plurality of time entries;

calculating a respective product for each of the candidate regions wherein the product for the candidate region is the scoring factor multiplied by a sum of time entry scores in the candidate region;

determining a respective quota and a respective spill for each of the candidate regions, wherein the quota is an integer portion of the respective product for the candidate region and wherein the spill is a decimal portion of the respective product for the candidate region; and selecting the plurality of regions based on the quota for each candidate region.

6. The method of claim 5 wherein determining the quota for each of the candidate regions further comprises:

ranking the candidate regions according to the quota and spill for each of the candidate regions;

calculating a sum of the spills for the candidate regions; and adding a respective portion of the sum of spills to one or more of the candidate regions according to the ranking.

7. The method of claim 5 wherein selecting the plurality of regions based on the quota for each candidate region further comprises sub-dividing each candidate region into a number of regions corresponding to the quota for the candidate region.

8. The method of claim 1 wherein selecting the article for each selected region comprises selecting an article of the articles corresponding to time entries in the region having a highest article score.

9. The method of claim 1 wherein selecting the article for each selected region comprises:

clustering the articles corresponding to time entries in the selected region to generate a cluster of articles and one or more outlying articles that are not in the cluster; and selecting an article from the cluster of articles, the selected article having a highest article score of the articles in the cluster.

10. The method of claim 1 wherein providing the summary of the topic comprises providing a timeline of articles on the topic, the timeline including an identification of each of the selected articles.

11. A system comprising:

data processing apparatus configured to perform operations comprising:

calculating a respective article score for each of a plurality of articles on a topic wherein the respective article score is calculated, in part, from a respective score of another article in the plurality of articles that was published before the article;

obtaining respective scores for a plurality of time entries, each time entry corresponding to a time period during which one or more articles on a topic were published, wherein the score for a time entry is based on, at least, a combination of respective article scores for each of the one or more articles associated with the time entry, and wherein the time entries have an associated order with respect to a timeline;

identifying candidate regions of time entries, wherein each candidate region represents one or more time entries that follow each other in the order, and wherein the candidate regions are separated from each other in the order by one or more time entries each having a score that does not exceed a threshold;

selecting a plurality of regions from the candidate regions;

selecting a respective article for each selected region, wherein the article selected for the region is an article associated with a particular time entry of the one or more time entries of the region; and providing a summary of the topic, wherein the summary references the selected articles.

12. The system of claim 11 wherein the operations further comprise selecting the plurality of regions based on, at least, the scores and an amount of time represented by each of the plurality of time entries.

13. The system of claim 11 wherein an article score for an article is based on, at least, a content quality score and a source quality score for the article.

14. The system of claim 11, wherein the threshold is based on a highest score of the plurality of the time entry scores.

15. The system of claim 11 wherein selecting the plurality of regions from the candidate regions comprises:

calculating a scoring factor by dividing a number of desired regions by a sum of the scores for the plurality of time entries;

calculating a respective product for each of the candidate regions wherein the product for the candidate region is the scoring factor multiplied by a sum of time entry scores in the candidate region;

determining a respective quota and a respective spill for each of the candidate regions, wherein the quota is an integer portion of the respective product for the candidate region and wherein the spill is a decimal portion of the respective product for the candidate region; and selecting the plurality of regions based on the quota for each candidate region.

16. The system of claim 15 wherein determining the quota for each of the candidate regions further comprises:

ranking the candidate regions according to the quota and spill for each of the candidate regions;

calculating a sum of the spills for the candidate regions; and adding a respective portion of the sum of spills to one or more of the candidate regions according to the ranking.

17. The system of claim 15 wherein selecting the plurality of regions based on the quota for each candidate region further comprises sub-dividing each candidate region into a number of regions corresponding to the quota for the candidate region.

18. The system of claim 11, wherein selecting the article for each selected region comprises selecting an article of the articles corresponding to time entries in the region having a highest article score.

19. The system of claim 11 wherein selecting the article for each selected region comprises:
   clustering the articles corresponding to time entries in the selected region to generate a cluster of articles and one or more outlying articles that are not in the cluster; and
   selecting an article from the cluster of articles, the selected article having a highest article score of the articles in the cluster.

20. The system of claim 11 wherein providing the summary of the topic comprises providing a timeline of articles on the topic, the timeline including an identification of each of the selected articles.

21. A non-transitory computer-readable medium having a computer program stored thereon, the computer program comprising instructions that, when executed by data processing apparatus, cause the data processing apparatus to perform operations comprising:

calculating a respective article score for each of a plurality of articles on a topic wherein the respective article score is calculated, in part, from a respective score of another article in the plurality of articles that was published before the article;

obtaining respective scores for a plurality of time entries, each time entry corresponding to a time period during which one or more articles on a topic were published, wherein the score for a time entry is based on, at least, a combination of respective article scores for each of the one or more articles associated with the time entry, and wherein the time entries have an associated order with respect to a timeline;

identifying candidate regions of time entries, wherein each candidate region represents one or more time entries that follow each other in the order, and wherein the candidate regions are separated from each other in the order by one or more time entries each having a score that does not exceed a threshold;

selecting a plurality of regions from the candidate regions;

selecting a respective article for each selected region, wherein the article selected for the region is an article associated with a particular time entry of the one or more time entries of the region; and providing a summary of the topic, wherein the summary references the selected articles.

* * * * *